United States Patent [19]

Dodge et al.

[11] Patent Number: 4,780,730
[45] Date of Patent: Oct. 25, 1988

[54] LED-ARRAY IMAGE PRINTER

[75] Inventors: Dennis W. Dodge, Amherst; Robert Signorello, Nashua, both of N.H.

[73] Assignee: Itek Graphix Corp., Waltham, Mass.

[21] Appl. No.: 850,630

[22] Filed: Apr. 11, 1986

[51] Int. Cl.⁴ .................. G01D 9/42; G01D 15/16
[52] U.S. Cl. .......................... 346/108; 346/139 R; 354/5; 354/7
[58] Field of Search .............. 346/76 L, 107 R, 108, 346/139 R; 354/5, 6, 7, 12, 13, 19

[56] References Cited

U.S. PATENT DOCUMENTS

| | | | |
|---|---|---|---|
| 3,952,311 | 4/1976 | Lapeyre | 346/107 R |
| 4,090,206 | 5/1978 | Pfeiffer | 346/107 R |
| 4,096,486 | 6/1978 | Pfeiffer | 341/107 R |
| 4,107,687 | 8/1978 | Pfeiffer | 346/107 R |
| 4,318,597 | 3/1982 | Kotani | 354/5 |
| 4,342,504 | 8/1982 | Ebner | 346/107 R |
| 4,376,282 | 3/1983 | Kotani | 346/107 R |
| 4,378,149 | 3/1983 | Ebner | 346/30 |
| 4,429,319 | 1/1984 | Löfman | 346/108 |
| 4,532,526 | 7/1985 | Behrens | 346/107 R |
| 4,571,602 | 2/1986 | De Schamphelaere | 346/108 |

FOREIGN PATENT DOCUMENTS 568593 6/1973 Switzerland .
2099221 12/1982 United Kingdom .

Primary Examiner—E. A. Goldberg
Assistant Examiner—Mark Reinhart
Attorney, Agent, or Firm—Morgan & Finnegan

[57] ABSTRACT

An optical printhead for contact or non-contact printing on a photosensitive material. The printhead traverses the photosensitive material and is provided with a substrate having a light emitting diode matrix and an interface circuit therein. A lens barrel provided with an optical system therein focuses the diode matrix onto the photosensitive material.

17 Claims, 4 Drawing Sheets

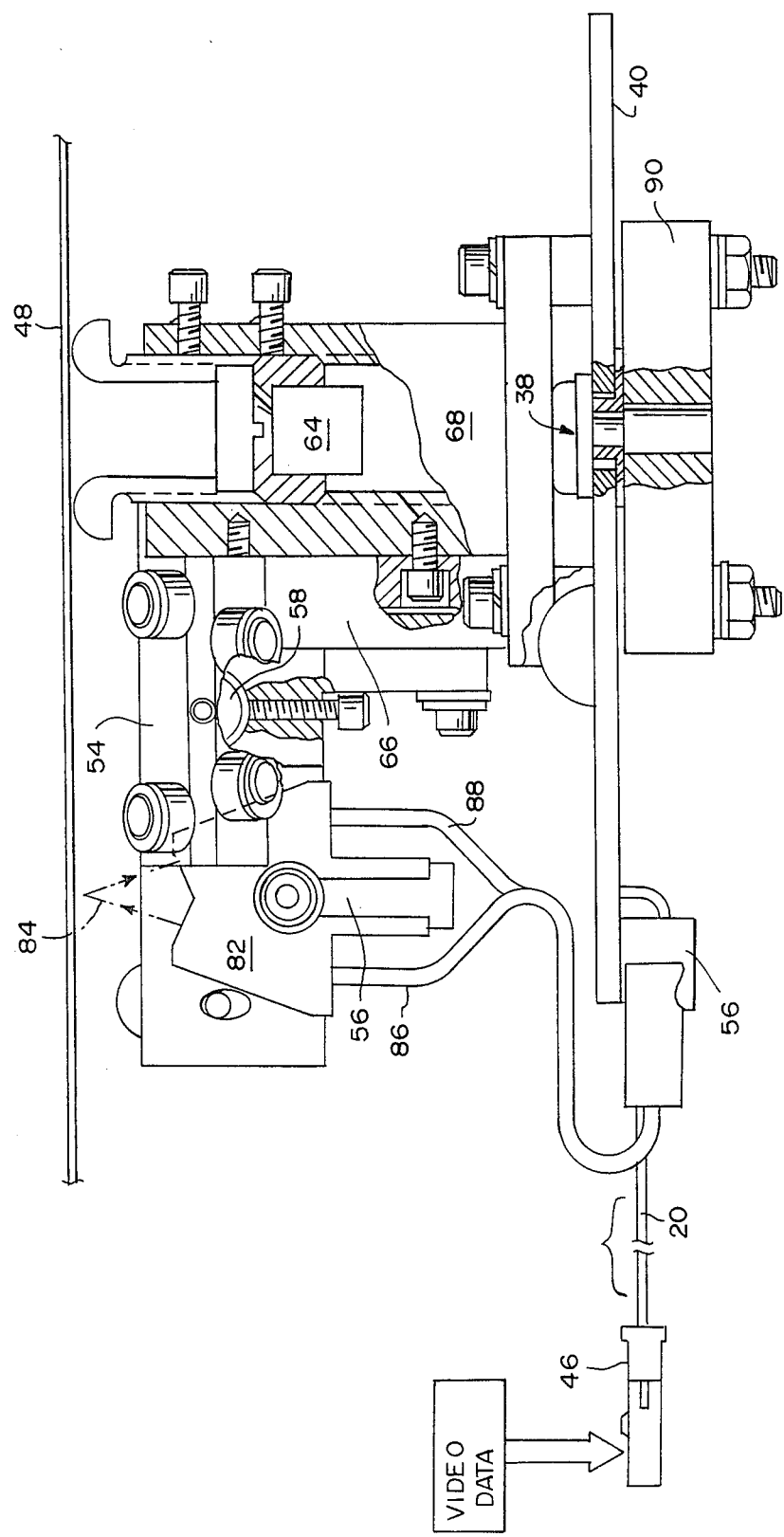

LED-ARRAY IMAGE PRINTER

BACKGROUND OF THE INVENTION

During the last thirty years, numerous so-called second generation phototypesetters have been marketed. These machines flash-illuminate characters positioned upon a whirling character disk or drum, and the resulting optical image is projected by a lens system upon a photosensitive film. The size of the characters is changed by means of moving zoom lenses or the like, or by rotating a lens turret to position various lenses at the optical projection axis. The characters are sequentially recorded upon the photosensitive film by mechanically scanning such film which may be accomplished in various ways. The film carriage may be moved relative to the optical axis, the projection lenses may be moved relative to the film platen, the whirling character disk may be moved relative to the film platen, or various combinations of the foregoing may be employed to sequentially project the characters upon the film to form a line of characters. Generally, the projection lens carriage assemblies are relatively heavy and bulky, as is the drum or disk bearing the images of the characters to be projected. Also, changes in the fonts involve manual replacement of the character disk, or film strips mounted upon a drum. Additionally, the electromechanical stepping devices for producing the above-mentioned scanning motions are also relatively bulky and cumbersome. The speed of these second generation machines is limited by the output carriage escapement speed and by character access time determined by the rotational speed of the font disk.

Third generation phototypesetters were introduced in the 1960's to overcome the deficiencies of the second generation phototypesetters. Most of these new typesetters utilize cathode ray tubes for generating the characters upon the face of the tube. These character images are thereafter optically projected upon the film. In contrast with the components of the second generation machines, the electron beam is inertialess and higher character-producing speeds could be generated. Various font families may be generated by these machines since the character-generating codes may be densely packed during recordation upon a magnetic storage media, such as floppy disks. Additionally, the character size may be electronically changed by changing the length of the beam faces comprising the character components. However, while these third generation machines are faster, more accurate and more flexible than the second generation machines, the cost of these new machines is much greater than the second generation machines.

U.S. Pat. Nos. 3,952,311 issued to Lapeyre; 4,090,206 issued to Pfeifer et al; 4,096,486 issued to Pfeifer et al; 4,107,687 issued to Pfeifer et al; 4,318,597 issued to Kotani et al and 4,376,282 issued to Kotani et al as well as Swiss Patent No. 568,593 were developed as improvements to the third generation phototypesetters. All of these references utilized a light-emitting diode (LED) array to produce images which are recorded on radiation-sensitive recording material. With the exception of the Pfeifer et al '206 patent, all of the LED arrays are immobile and span virtually the entire width of the recording material. Images are recorded onto the material by continuously or intermittently advancing the radiation-sensitive material perpendicularly through the radiation generated by the LED array. Pfeifer et al '206 illustrates a method and apparatus for recording images onto a radiation-sensitive medium by utilizing an LED array which is not completely immobile. However, this array merely oscillates as the radiation-sensitive paper passes thereunder to provide a better resolution.

U.S. Pat. No. 4,342,504 issued to Ebner is an improvement upon the immobile printing head described in the above-noted patents and utilizes a printing head which traverses the width of the radiation-sensitive material. This printing head is connected to an LED matrix via a plurality of fiber-optic ribbons. The matrix in turn is connected to circuitry for producing the proper response from the matrix at a particular point in time. The movable printer head is connected to a carriage mechanism to allow the printer head to traverse the radiation-sensitive material at a particular speed in relation to the data supplied to the matrix and in turn the radiation pulses supplied to the printing head. However, while Ebner '504 describes a phototypesetting machine which is relatively inexpensive and accurate, problems have arisen in the construction and utilization of this device. Although this phototypesetter is constructed only with the use of robotics, the attachment of each and every optic fiber between the LED matrix and the printhead is laborious, time-consuming and relatively inaccurate due to the fine tolerances which must be maintained. Additionally, the use of robotics itself is a relatively expensive proposition and the number of units produced is limited to the number of robots available. Furthermore, each fiber band is fragile and susceptible to breakage, and the resolution of the light produced at the head is fixed and limited by the fiber diameter.

U.S. Pat No. 4,378,149 to Ebner has been developed to overcome some of the problems enumerated with respect to the Ebner '504 patent. This patent describes a high-speed character printer in which the LED matrix is directly provided on the face of the movable printhead, thus eliminating the fiber-optic bundle. A cable is provided between the printhead and a signal source to indicate which of the LED's are to be activated at a particular time. As was true with Ebner '504, the printhead traverses the width of the radiation-sensitive material when the material is stationary, and after the head has traversed to the edge of the radiation-sensitive material, this material will be advanced. However, while Ebner '149 is an improvement upon Ebner '504, both of these phototypesetters suffer from the disadvantage of employing a printhead which must contact the radiation-sensitive material. The printhead utilized in both Ebner patents has a metal/glass interface with the sensitive emulsion which typically can scratch the emulsion. Additionally, both of these patents utilize solid-state integrated circuits for driving the LED's provided on a substrate not directly in proximity with the printhead.

SUMMARY OF THE INVENTION

The present invention overcomes the deficiencies of the prior art by providing a high-speed, low-cost character printer having particular utilization with phototypesetters. This printer consists of a movable printhead provided with an LED array integrated with the logic and driver circuit on a single substrate. An optical system is used to focus the LED outputs onto the radiation-sensitive paper. Based upon the type of phototypesetter and transport used therewith, the carriage assembly would contact the emulsion with a low friction shoe, or would not contact the paper at all. A cable is directly connected between the logic array and the phototypesetter to provide the signals needed to generate the outputs to the various LED's as well as to coordinate these outputs with the movement of the head across the radiation-sensitive material and the intermittent advance of this material at the culmination of each print line.

BRIEF DESCRIPTION OF THE DRAWINGS

For a more complete understanding of the present invention and further advantages thereof, reference may now be made to the following description taken in conjunction with the accompanying drawings in which:

FIG. 3 shows a front elevational view of the carriage assembly in FIG. 2;

DETAILED DESCRIPTION OF THE DRAWINGS

Figure 1:
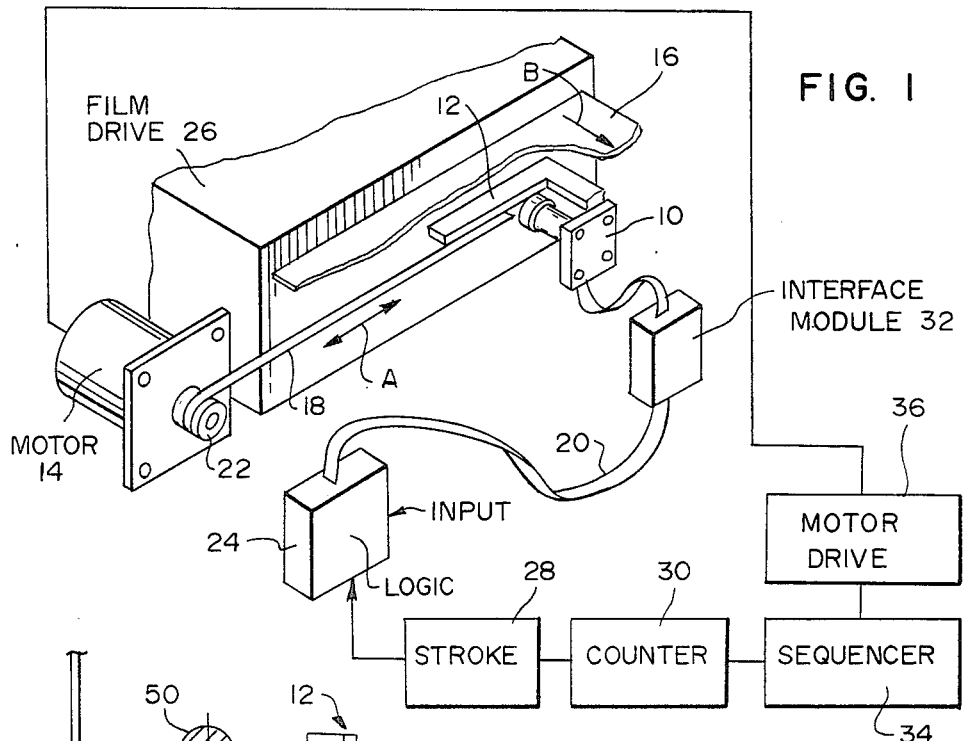
FIG. 1 shows the preferred embodiment of the present invention.

FIG. 1 describes a character printer utilizing the printhead of the present invention. The printhead 10 is provided on a movable carriage 12 which traverses across a photosensitive medium 16 in a bidirectional manner, as indicated by the arrows designated A. The means of traversing across the photosensitive medium 16 is described with respect to U.S. Pat. No. 4,342,504 which is hereby incorporated by reference with respect to this particular mechanism. A steel belt 18 is connected to the carriage 12 and is applied to a drum 22 which is driven by a motor 14. After the printhead 10 has reached the end of a particular line, a film drive 26 causes the photosensitive medium to be stepped in the direction indicated by the arrow B which is perpendicular to the printhead scanning direction, to set the stage for the recordation of the next line of characters. Electrical conductors are provided in an electrical cable 20 connected between the printhead 10 and a logic module 24 which controls the activation of the light-emitting diodes (LED's) provided in the printhead, via an interface module 32. The logic module 24 coordinates with the printhead the exact time that the particular LED's must be activated to produce the desired character or portion of the characters and logic module 24 would also be utilized to properly coordinate the movement of the printhead 10 across the photosensitive medium 16. This logic would also control a strobe 28 which drives counter 30. Additionally, a four-phase motor winding sequencer 34 is used to cause motor drive circuits 36 to drive the motor 14 at the correct speed. Although the interface module 32 is directly provided at the substrate, it has been illustrated in a block diagram as a separate entity for simplicity and the module will be described in greater detail with respect to FIG. 5.

Figure 4:
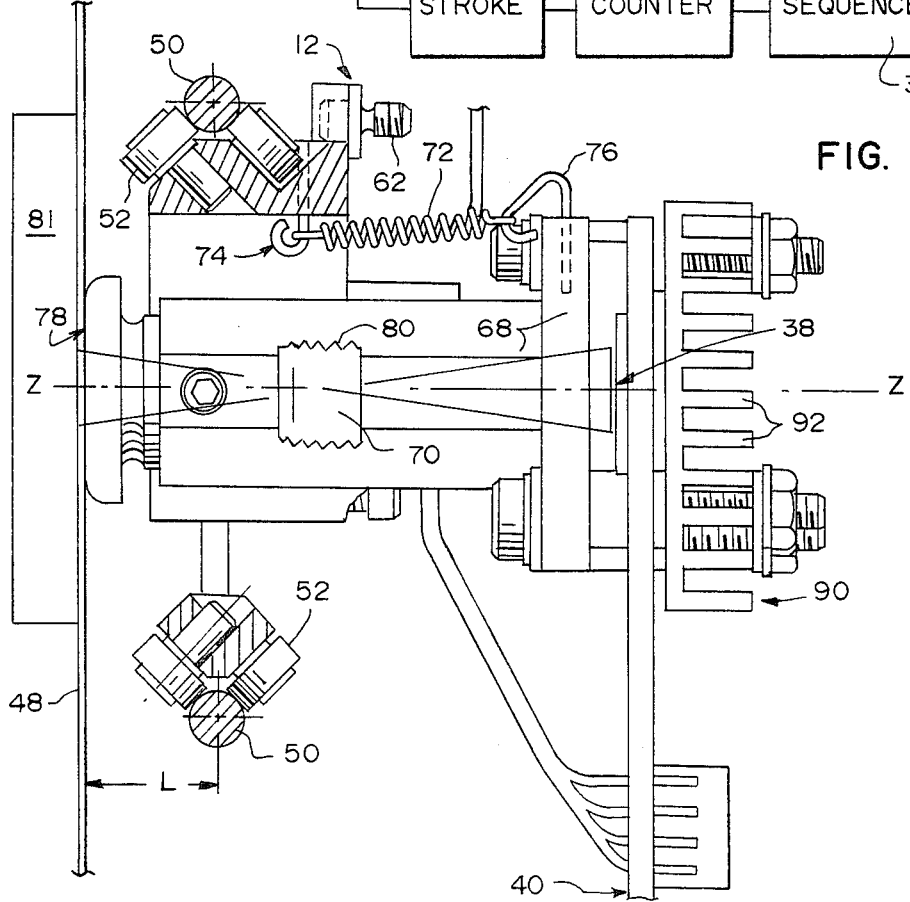
FIG. 4 is a side elevational view of the carriage assembly shown in FIG. 2.
Figure 2:
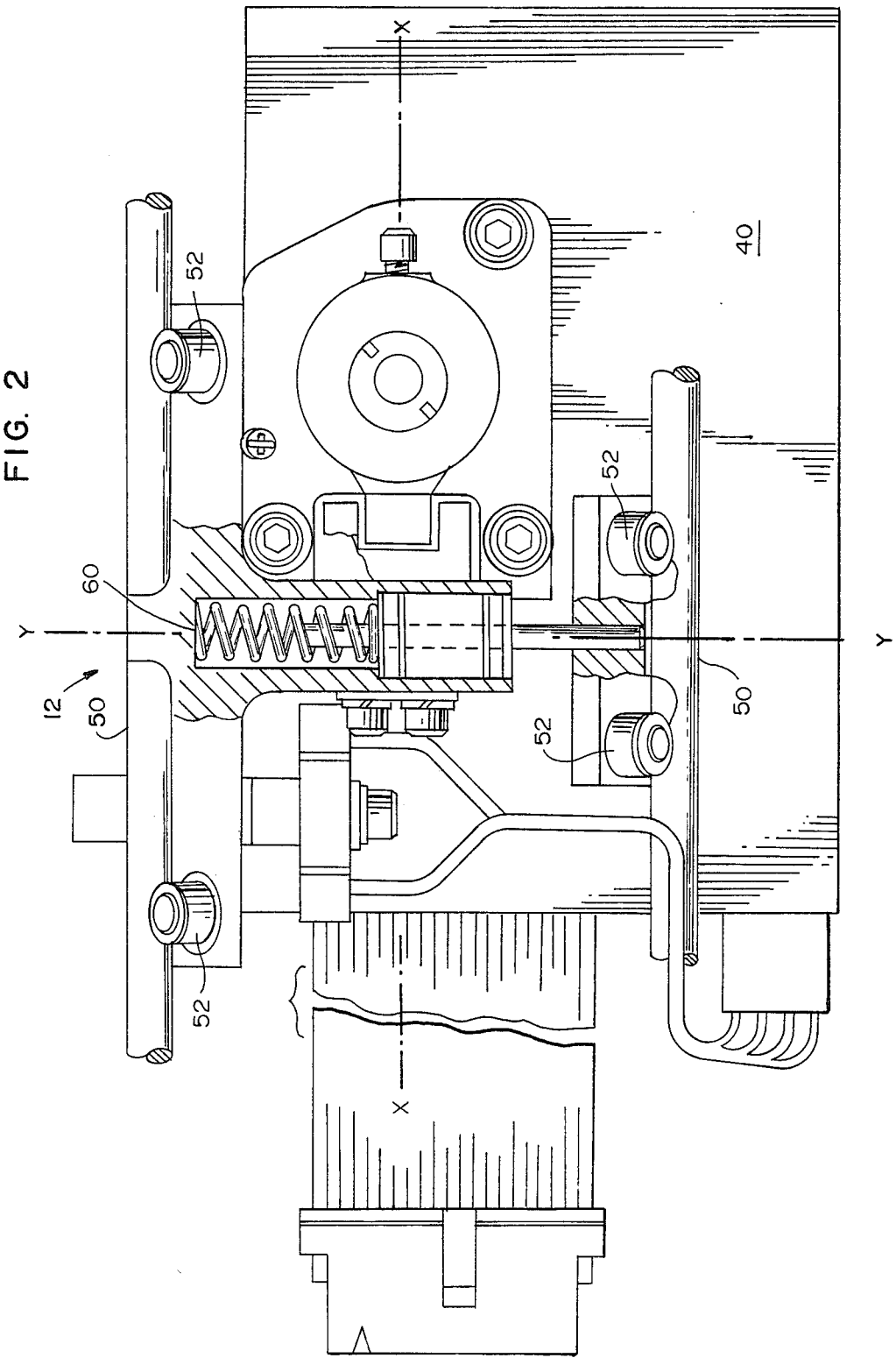
FIG. 2 shows a top view of the carriage assembly.

FIGS. 2, 3 and 4 illustrate the printhead 10 of the present invention provided on the movable carriage 12. This printhead consists of an LED array 38 provided directly upon a substrate 40, which could, for example, be constructed from fiberglass or ceramic material. Although not limited to the exact number of LED's, the present invention utilizes a matrix array of either 128 or 256 LED's. This integrated circuit including the interface module 32 and the LED's provided on the substrate are in direct communication with a host computer through the use of the cable 20 and a connector 46. In this manner, video data is sent to the interface and logic circuits provided on the substrate 40, the video data connected to the video processor circuitry of the host computer.

The movable carriage assembly 12 moves back and forth across the surface of the photosensitive medium 48 by traversing two parallel guide rails 50, utilizing four guide bearing pairs 52. These guide bearing pairs are affixed to the carriage assembly 12 by a single carriage bearing mount block 54 which is maintained in the correct position by a screw 56 and a linear ball bushing 58. As shown particularly in FIG. 2, each of the four guide bearing pairs consists of two bearings provided in a "V" configuration and biased in place by a compression spring 60. Movement of the carriage assembly along the guide rails 50 is provided by the movement of the steel belt 18 powered by the motor 14. A pin 62 is used to attach the belt 18 to the carriage 12 and the carriage would thus scan the width of a page to be typeset in the X direction as shown in FIG. 2.

An optical lens assembly 64 is mounted on a linear ball slide 66 provided within an optical lens barrel mount 68. The mount 68 is affixed to the LED array 38 and a single lens 70 is provided therein. Although it has been determined that a spherical lens can be used, the particular shape of the lens is relatively unimportant and other lenses, such as a cylindrical lens, can be used. The purpose of the ball slide 66 is to constrain the motion of the lens 70 to the "Z" axis only (as shown in FIG. 4). Extension spring 72, affixed to the carriage assembly 12 and the lens barrel mount by spring hooks 74,76, insures that a pressure foot 78, connected to the lens barrel mount 68 is always in contact with the photosensitive medium 48, thereby insuring that the lens 70 is in proper focus and alignment. This is necessary in this particular embodiment since the distance "L" (as shown in FIG. 4) between the middle of guide rail 50 and the photosensitive mediuum 48 varies, and it is crucial that a set distance between the lens 70 and the photosensitive medium 48 be maintained. However, please note that it is not imperative that the foot 78 contact the photosensitive medium 48 if a stable distance can be provided between the lens 70 and the medium.

The position of the lens 70 in the lens barrel mount 68 is altered by any suitable adjustment device such as the threaded barrel 80 shown in FIG. 4. This adjustment could be manually made when the printhead is detached from the character printer, based upon the direct rotation of the threaded barrel 80 or other adjustment means, or automatically accomplished by providing an electronic adjustment similar to that used in so-called "zoom" lenses. This adjustment would allow for a large range of resolution and print dot sizes ranging from 400 dots per inch (DPI) up to a high density array of 800 DPI or possibly higher. A fixed backing plate 81, held in place by gravity, is used to positively define and maintain the focal plane for the lens assembly, with the photosensitive medium held between the plate 81 and the pressure foot 78. Additionally, since a fiber-optic bundle is not utilized, a better uniformity of light output is produced by the individual LED's. Furthermore, a Gaussian distribution of light is produced which smooths the curves of the characters and results in improved type quality. Although various LED arrays could be utilized, the present invention employs module model no. TPMP 8160 or 7160 produced by AEG Telefunken Corporation. This particular module is provided with a matrix of LED's provided in a single, perpendicular column. However, various other configurations of the matrix with multiple rows and columns could be employed without departing from the scope of the present invention.

A photo-optical sensor 82 is provided directly on the carriage assembly to sense the presence or absence of the photosensitive medium 48 as well as measuring the width of the medium as evidenced by the reflected light beam 84 shown in FIG. 3. This information is fed to the connector 56 by cables 86,88 and is also fed back to the host computer.

As previously noted, the printhead moves back and forth across the surface of the photosensitive medium 48 as shown in FIG. 1. This motion allows the electronics and LED's to be cooled through the use of a heat sink 90 having a plurality of flutes 92 by virtue of the motion of the carriage assembly and thus no forced air cooling system is needed.

Additionaly, in counterdistinction with the prior art printheads, it is not necessary for the printhead to physically contact the photosensitive media. This contact would of necessity scratch the emulsion provided on the surface of the printhead thereby producing an output provided with a number of irregularities. A polyester tape has often been affixed to the outside of the printhead to prevent these irregularities from occurring. The optics utilized in the present invention would allow an image to be produced on the surface of the photosensitive medium without the necessity of directly contacting the medium. Alternatively, a low friction "non-abrading" material, such as UHMW polyethylene, can be used as the material for the pressure foot 78 which could contact the emulsion to control the exact optical path length and allow for the use of a low cost paper transport mechanism.

Figure 5:
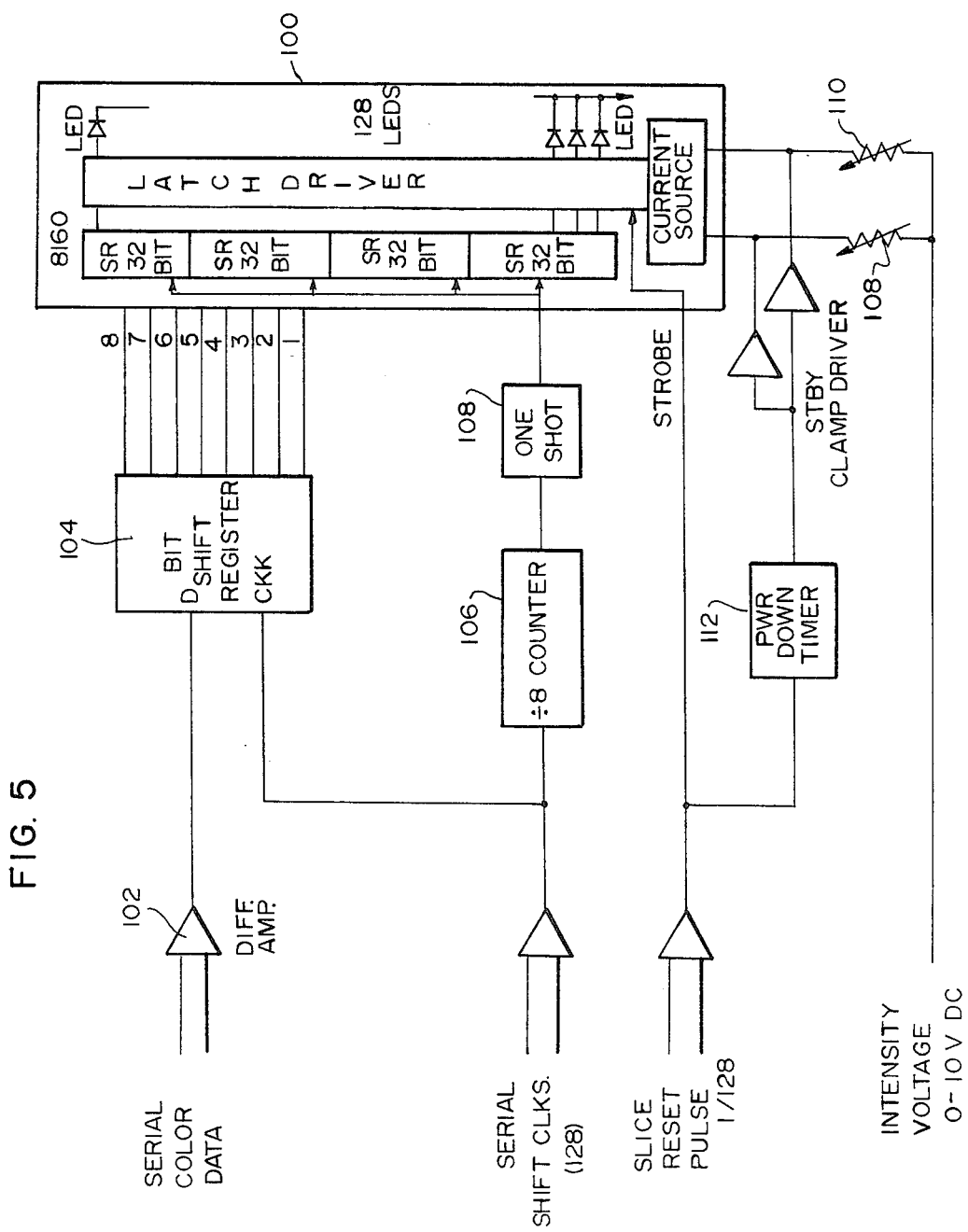
FIG. 5 is a schematic drawing of the electronics used to control the printhead.

FIG. 5 illustrates various interface circuits used to project data received from a computer onto the photosensitive medium 48 utilizing the Telefunken TPMP 7160 or 8160 surface mounted LED array chip 100. For the purpose of the present discussion we will assume that the TPMP 7160 having 128 LED's is being employed. Serial color data is applied to a differential amplifier 102 and then to an eight bit shift register 104 which converts eight bits of serial data into eight bits of parallel data with its outputs tied to the 7160 data lines. This register 104 is clocked by 128 shift clocks which drives a divide by eight counter 106. The divide by eight counter 106 is clocked on the rising edge of the shift clock and generates a low going edge every eight shift clocks. The low going edge stores eight bits of serial color data in shift register 104 and also triggers a one-shot 108. A 0.5 microsecond output pulse generated by the one-shot 108 transfers data sitting on the output lines of the shift register 104 into the four parallel 32 bit shift registers located inside chip 100. This sequence is repeated 16 times per slice, equaling 128 shift clocks. After 128 shift clocks, a positive pulse is developed from the slice reset pulse and is applied to the strobe input to the chip 100 which moves the entire slice, 128 bits of color data from the internal shift registers to the output latch/driver. The intensity of the light output of the LED's is proportional to the amount of current delivered to the chip 100. Potentiometers 108,110 would limit this current to a maximum of 9.9 ma. A reduction in power timer 112 is set to conserve the power dissipation. If no slice reset pulses are present on the timer 112 every 80 microseconds, indicating no visible data to the printhead, the LED intensity current is grounded and the chip 100 is in its standby condition dissipating only one-third of its normal operating power.

Numerous characteristics and advantages of the present invention have been set forth in the foregoing description, together with details of the structure and function of the invention, and the novel features hereof are pointed out in the appended claims. The disclosure, however, is illustrative only, and changes may be made in detail, especially in matters of size, shape and arrangement of the parts, within the principle of the invention, to the fullest extent indicated by the broad general meaning of the terms utilized in the appended claims.

What is claimed is:

1. An optical printhead system for printing on a photosensitive medium comprising:
   a substrate;
   a light-emitting diode array provided directly on said substrate;
   an interface circuit for controlling the activation of each light emitting diode provided in said array, said interface circuit provided directly on said substrate and electrically connected to said light-emitting diode array;
   a drive carriage for transporting said substrate across the surface of the photosensitive medium to allow said light-emitting diode array to scan the surface of the photosensitive medium by activating at least one light-emitting diode while said drive carriage is traversing the surface of the photosensitive medium;
   motor means connected to said drive carriage for moving said drive carriage across the photosensitive medium;
   photosensitive medium advance means for stepping the photosensitive medium in a direction perpendicular to the printhead scanning direction after said printhead scans a single line; and
   an optical system provided between said light-emitting diode array and the photosensitive medium, said optical system being in optical communication with said array and with the photosensitive medium for focussing radiation produced by each of the diodes in said light-emitting diode array directly onto the photosensitive medium.

2. The optical printhead system according to claim 1 wherein said optical system further comprises a lens holder and a lens, said lens holder supporting said lens to focus the raidiaton produced by each of the diodes in said array onto the photosensitive medium.

3. The optical printhead system in accordance with claim 2 wherein said lens is a spherical lens.

4. The optical printhead system in accordance with claim 3 wherein said lens is a cylindrical lens.

5. The optical printhead system in accordance with claim 1 wherein said light-emitting diode array further comprises a linear array.

6. The optical printhead system in accordance with claim 2 further comprising adjustment means connected to said lens holder for adjusting the position of said lens relative to said array.

7. The optical printhead system in accordance with claim 2 further comprising a pressure foot connected to said lens holder, said pressure foot directly contacting the surface of the photosensitive medium.

8. An optical printhead system for printing on a photosensitive medium comprising:
- a substrate;
- a light-emitting diode array provided directly on said substrate;
- a drive carriage for transporting said substrate across the surface of the photosensitive medium to allow said light-emitting diode array to scan the surface of the photosensitive medium by activating at least one light-emitting diode while said carriage is traversing the surface of the photosensitive medium;
- motor means connected to said drive carriage for moving said drive carriage across the photosensitive medium;
- photosensitive medium advance means for stepping said photosensitive medium in a direction perpendicular to the printhead scanning direction after said printhead scans a single line; and
- an optical system provided in optical communication with said light emitting diode array and the photosensitive material for focusing the radiation produced by each of the diodes in said light-emitting diode array directly upon th photosensitive medium.

9. The optical printhead system in accordance with claim 8 wherein said optical system further comprises a lens barrel supporting a lens.

10. The optical printhead system in accordance with claim 9 wherein said lens is a cylindrical lens.

11. The optical printhead system in accordance with claim 9 wherein said lens is a single spherical lens.

12. The optical printhead system in accordance with claim 11, further including adjusting means connected to said single spherical lens for adjusting the position of said lens in said lens barrel.

13. The optical printhead system in accordance with claim 9 further including a pressure foot directly connected to said lens barrel, said pressure foot in direct communication with the surface of the photosensitive medium.

14. An optical printhead system for printing on a photosensitive medium comprising:
- a substrate;
- a light-emitting diode array provided directly on said substrate;
- an interface circuit for controlling the activation of each light-emitting diode provided in said array, said interface circuit directly provided on said substrate and electrically connected to said light-emitting diode array;
- a drive carriage for transporting said substrate across the surface of the photosensitive medium to allow said light-emitting diode array to scan the surface of the photosensitive medium by activating at least one light-emitting diode while said drive carriage is traversing the surface of the photosensitive medium;
- motor means connected to said drive carriage for moving said drive carriage across the photosensitive medium;
- photosensitive medium advance means for stepping said photosensitive medium in a direction perpendicular to the printhead scanning direction after said printhead scans a single line;
- a lens barrel provided in optical communication with said light-emitting diode array and the photosensitive material; and
- an optical system provided within said lens barrel for focusing the radiation produced by each of the diodes in said light-emitting diode array directly upon the photosensitive material.

15. The optical printhead system in accordance with claim 14 further including a pressure foot directly connected to said lens barrel, said pressure foot in directly contacting the surface of the photosensitive medium.

16. The optical prinhead system in accordance with claim 14 wherein said optical system further comprises a single spherical lens.

17. The printhead system in accordance with claim 16 wherein said light emitting diode array further comprises a linear array.

* * * * *